(12) United States Patent
Lu

(10) Patent No.: US 9,130,404 B2
(45) Date of Patent: Sep. 8, 2015

(54) MULTIPLE REDUNDANT SOLAR POWER SYSTEM

(71) Applicant: DAR YUN ENERGY SCIENCE TECHNOLOGY CO., LTD., Taoyuan County (TW)

(72) Inventor: Yung-Chi Lu, Taoyuan County (TW)

(73) Assignee: Dar Yun Energy Science Technology Co., Ltd., Taoyuan County (TW)

( * ) Notice: Subject to any disclaimer, the term of this patent is extended or adjusted under 35 U.S.C. 154(b) by 383 days.

(21) Appl. No.: 13/802,806

(22) Filed: Mar. 14, 2013

(65) Prior Publication Data

US 2013/0271062 A1    Oct. 17, 2013

(30) Foreign Application Priority Data

Apr. 17, 2012  (TW) .............................. 101207047 U

(51) Int. Cl.
*H02J 7/00*   (2006.01)
*H02J 7/35*   (2006.01)
*H02J 7/02*   (2006.01)

(52) U.S. Cl.
CPC ................. *H02J 7/35* (2013.01); *H02J 7/0054* (2013.01); *H02J 7/02* (2013.01); *H02J 7/0055* (2013.01); *Y02E 10/566* (2013.01)

(58) Field of Classification Search
CPC .................................... H02J 7/35; H02J 3/383
USPC .......................................... 320/101, 103, 163
See application file for complete search history.

(56) References Cited

U.S. PATENT DOCUMENTS

2008/0143292 A1\* 6/2008 Ward ............................ 320/101
2012/0187897 A1\* 7/2012 Lenk et al. .................... 320/101

\* cited by examiner

*Primary Examiner* — Edward Tso
*Assistant Examiner* — Aaron Piggush
(74) *Attorney, Agent, or Firm* — Leong C. Lei

(57) ABSTRACT

A multiple redundant solar power system comprises a primary solar power set, a secondary solar power set, a first control unit, and a second control unit. The primary solar power set includes a first solar panel, a first battery, and a first electrical output line. The secondary solar power set includes a second solar panel, a second battery, and a second electrical output line. The first control unit is connected between the first battery and the second battery. When the first battery has a low voltage, electrical power can be supplied from the second battery to the first battery. The second control unit is connected between the first battery and an external electrical power source. When the second battery has a low voltage, electrical power can be supplied from the external electrical power source to the first battery.

10 Claims, 2 Drawing Sheets

MULTIPLE REDUNDANT SOLAR POWER SYSTEM

TECHNICAL FIELD OF THE INVENTION

The present invention relates to a solar power system and, more particularly, to a multiple redundant solar power system.

DESCRIPTION OF THE PRIOR ART

There are various UPS (uninterruptible power supply) equipment that makes use of mixed power sources. For example, Taiwan's Utility Model Publication M3176985 disclosed an improved structure for electricity storage equipment, which comprises at least two electrical power sources and a piece of UPS equipment. The electrical power sources include a public electrical power source, oil-fed generators, solar panels, wind turbines, and fuel cells. The UPS equipment is provided with a power source selector therein and output terminals for connection with various electrical equipment. With such structure, when the public electrical power source for the UPS equipment is failed, the UPS equipment can select another power source to continue the electrical power supply.

Taiwan's Utility Model Publication M346913 disclosed a solar power device, which comprises a solar panel, a public electrical power supply, and a piece of UPS equipment, wherein the solar panel is a first power source and the public electrical power supply is a second power source. The UPS equipment is provided with a power source selector therein and output terminals for connection with various electrical equipment. The power source selector of the UPS equipment can select a suitable power source to supply power for various electrical equipment.

Taiwan's Utility Model Publication M399538 disclosed a UPS system using solar power and wind power for saving energy and maintaining a stable power supply, wherein multiple solar power sources and multiple wind power sources are connected to an electrolysis fuel cell, which is in turn connected to an inverter for converting dc power to ac power for various electrical equipment of ac type. Furthermore, a public electrical power source is taken to work with the renewable energy sources through an automatic transfer switch (ATS) so that, when the renewable energy sources cannot supply sufficient energy for various electrical equipment, the public electrical power supply can continue the power supply.

Although all above UPS equipment can supply electrical power from various power sources, such as solar power, wind power, public electrical power, and so on, they may produce electrical surge during a changeover of power source, which may cause damage to the electrical equipment connected thereto. Thus, there is a need to develop an improved power system that can solve the disadvantage of the existing UPS equipment.

SUMMARY OF THE INVENTION

The primary object of the present invention is to provide a multiple redundant solar power system that can avoid damage of the electronic equipment connected thereto due to an electrical surge occurred during a changeover of power source.

To achieve the above object, the multiple redundant solar power system may comprise a primary solar power set, a secondary solar power set, a first control unit, and a second control unit. The primary solar power set includes a first solar panel, a first battery electrically connected to the first solar panel, and a first electrical output line connected to the first battery. The secondary solar power set includes a second solar panel, a second battery electrically connected to the second solar panel, and a second electrical output line connected to the second battery. The first control unit, which is capable of detecting a low voltage of the first battery, is connected between the first battery and the second battery such that, when the first battery has a low voltage, the first control unit can react to the detection and form a closed electrical connection between the first battery and the second battery to allow electrical power to be supplied from the second battery to the first battery. The second control unit, which is capable of detecting a low voltage of the second battery, is connected between the first battery and an external electrical power source such that, when the second battery has a low voltage, the second control unit can react to the detection and form a closed electrical connection between the first battery and the external electrical power source to allow electrical power to be supplied from the external electrical power source to the first battery.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
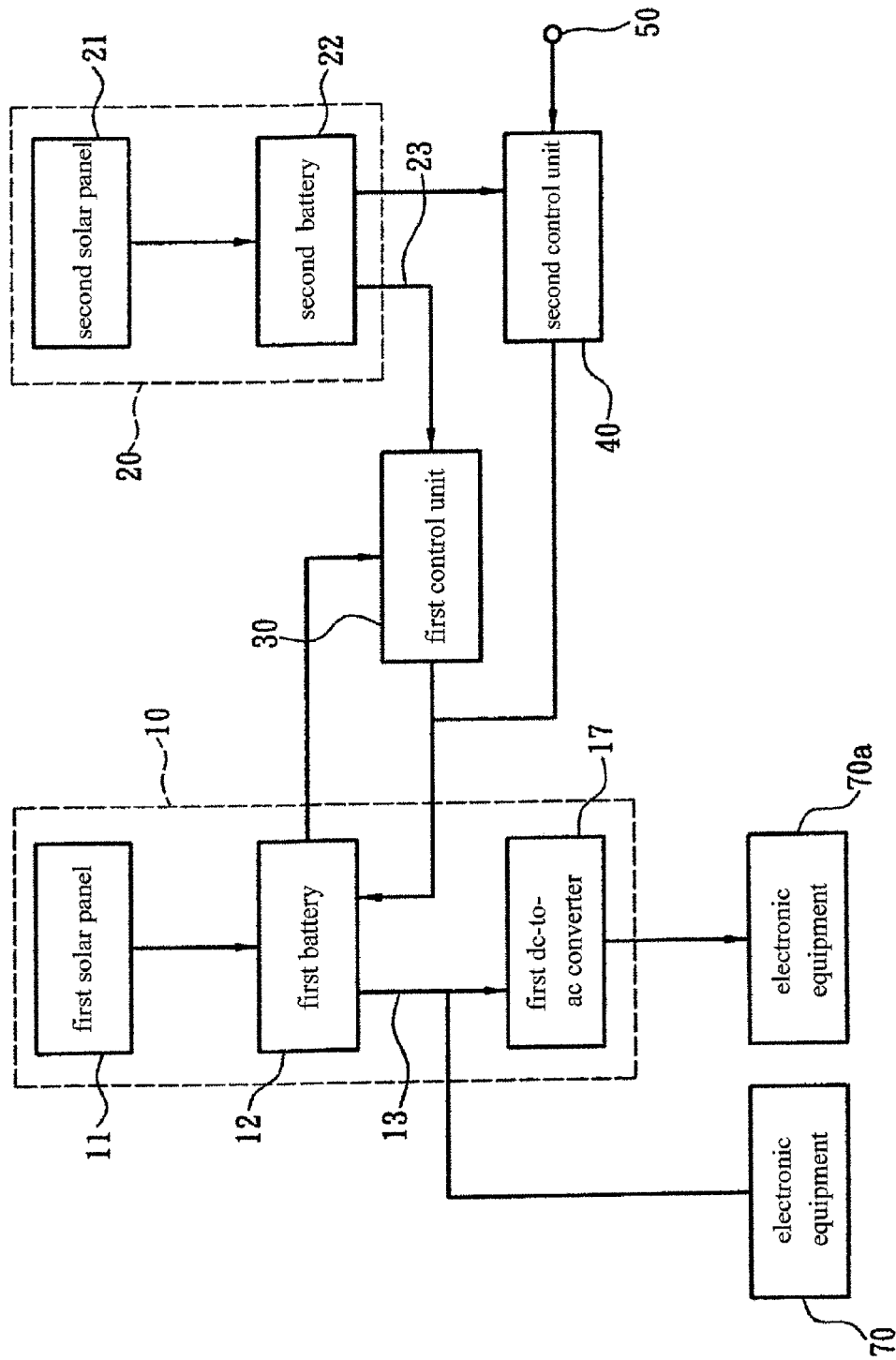
FIG. 1 shows an electrical diagram of a multiple redundant solar power system according to one embodiment of the present invention.

FIG. 1 shows an electrical diagram of a multiple redundant solar power system according to one embodiment of the present invention. As shown, the multiple redundant solar power system comprises a primary solar power set 10, a secondary solar power set 20, a first control unit 30, and a second control unit 40. The primary solar power set 10 includes a first solar panel 11, a first battery 12 electrically connected to the first solar panel 11, and a first electrical output line 13 connected to the first battery 12 for providing electrical terminals for various electronic equipment 70, 70a. The secondary solar power set 20 includes a second solar panel 21, a second battery 22 electrically connected to the second solar panel 21, and a second electrical output line 23 connected to the second battery 22. The secondary battery 12 can supply dc power to dc-driven equipment 70 through the first electrical output line 13. Also, the first electrical output line 13 can be provided with a first dc-to-ac converter 17 for supplying ac power to ac-driven equipment 70a.

The first control unit 30, which is capable of detecting a low voltage of the first battery 12, is connected between the first battery 12 and the first electrical output line 23 connected to the second battery 22 such that, when the first battery 12 has a low voltage, the first control unit 30 can react to the detection and form a closed electrical connection between the first battery 12 and the second battery 22 to allow electrical power to be supplied from the second battery 22 to the first battery 12. The second control unit 40, which is capable of detecting a low voltage of the second battery 22, is connected between the first battery 12 and an external electrical power source 50 such that, when the second battery 22 has a low voltage, the second control unit 40 can react to the detection and form a closed electrical connection between the first battery 12 and the external electrical power source 50 to allow electrical power to be supplied from the external electrical power source 50 to the first battery 12.

Figure 2:
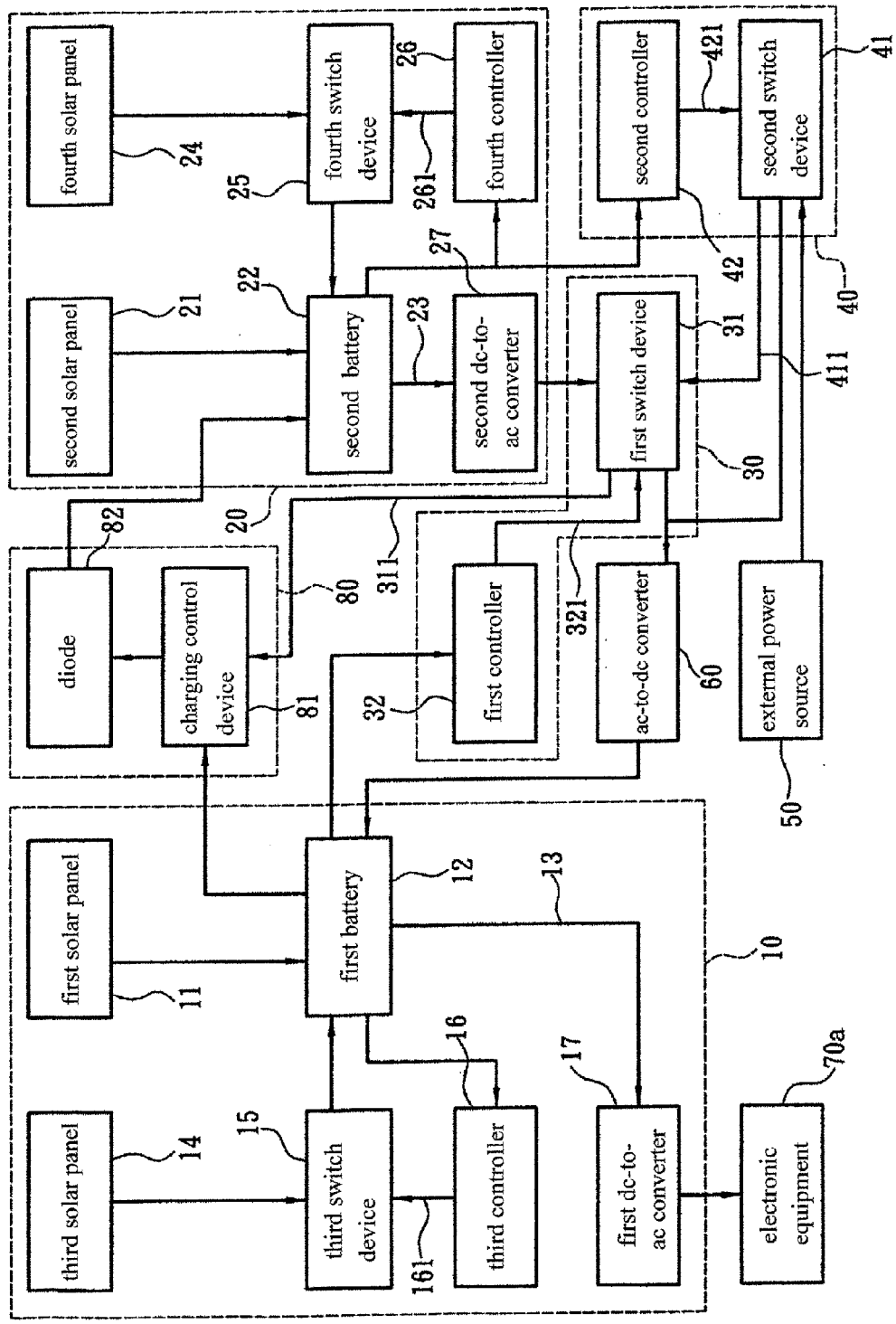
FIG. 2 shows an electrical diagram of a multiple redundant solar power system according to a modified embodiment of the present invention.

FIG. 2 shows an electrical diagram of a multiple redundant solar power system according to a modified embodiment of the present invention. As shown, for providing more abundant spare electrical power, the primary solar power set 10 may further include a third solar panel 14, a third switch device 15 electrically connected between the third solar panel 14 and the first battery 12, and a third controller 16 capable of detecting a low voltage of the first battery 12 and thus issuing a closing signal 161 to the third switch device 15 to allow the third solar panel 14 to charge the first battery 12. In the modified embodiment, when the third controller 16 detects the voltage of the first battery 12 being less than 29.8 volts (which may occur on cloudy day or at the time that the electronic equipment 70, 70a consumes a lot of electrical power), the third controller 16 can issue a closing signal 161 to the third switch device 15, thereby causing the third switch device 15 to be closed, so that electrical power can be supplied from the third solar panel 14 to the first battery 12. When the third controller 16 detects the voltage of the first battery 12 being greater than 29.8 volts (which may occur on sunny day), the third controller 16 can stop issuing the closing signal 161, thereby opening the third switch device 15 so as to stop the third solar panel 14 from charging the first battery 12.

Furthermore, the secondary solar power set 20 may further include a fourth solar panel 24, a fourth switch device 25 electrically connected between the fourth solar panel 24 and the second battery 22, and a fourth controller 26 capable of detecting a low voltage of the second battery 22 and thus issuing a closing signal 261 to the fourth switch device 25 to allow the fourth solar panel 24 to charge the second battery 22. In the modified embodiment, when the fourth controller 26 detects the voltage of the second battery 22 being less than 29.8 volts (which may occur on cloudy day or at the time that a lot of electricity is supplied from the second battery to the first battery), the fourth controller 26 can issue a closing signal 261 to the fourth switch device 25, thereby causing the fourth switch device 25 to be closed, so that electrical power can be supplied from the fourth solar panel 24 to the second battery 22. When the fourth controller 26 detects the voltage of the second battery 22 being greater than 29.8 volts (which can occur on sunny day), the fourth controller 26 can stop issuing the closing signal 261, thereby opening the fourth switch device 25 so as to stop the fourth solar panel 24 from charging the second battery 22.

In the modified embodiment, the first control unit 30 may include a first switch device 31 and a first controller 32, wherein the first switch device 31 is connected between the first battery 12 and the second electrical output line 23 connected to the second battery 22. The first controller 32 is capable of detecting a low voltage of the first battery 12 and thus issuing a closing signal 321 to the first switch device 31. The second electrical output line 23 of the secondary solar power set 20 is provided with a second dc-to-ac converter 27. Furthermore, the first control unit 30 may include an ac-to-dc converter 60 connected between the first switch device 31 and the first battery 12. In the modified embodiment, when the first controller 32 detects the voltage of the first battery 12 being less than 25 volts, the first controller 32 can issue a closing signal 321 to the first switch device 31, thereby causing the first switch device 31 to be closed, so that electrical power can be supplied from the second battery 22, passing through the second electrical output line 23, the second dc-to-ac converter 27 (where direct current is converted to alternate current of 220 volts), the first control device 31, the ac-to-dc converter 60 (where the alternate current of 220 volts is converted back to direct current of high voltage), and finally to the first battery 12. When the first controller 32 detects the voltage of the first battery 12 being greater than 28.5 volts, the first controller 32 can stop issuing the closing signal 321, thereby opening the first switch device 31 so as to stop electrical power flowing from the second battery 22 to the first battery 12.

In the modified embodiment, the second control unit 40 may include a second switch device 41 and a second controller 42, wherein the second switch device 41 is connected between the first battery 12 and the external electrical power source 50. The second controller 42 is capable of detecting a low voltage of the second battery 22 and thus issuing a closing signal 421 to the second switch device 41. The ac-to-dc converter 60 is also connected between the second switch device 41 and the first battery 12. In the modified embodiment, when the second controller 42 detects the voltage of the second battery 22 being less than 22 volts, the second controller 42 can issue a closing signal 421 to the second switch 41, thereby causing the second switch device 41 to be closed, so that electrical power can be supplied from the external electrical power source 50 (with ac power of 220 volts), passing through the second control device 41, the ac-to-dc converter 60 (where the alternate current of 220 volts is converted back to direct current of high voltage), and finally to the first battery 12. Furthermore, the closing of the second switch device 41 can cause the first switch device 31 to be opened by an opening signal 411, so as to stop electrical power flowing from the second battery 22 to the first battery 12. Therefore, simultaneous electrical power supply from both of the second battery 22 and the external electrical power source 50 can be avoided. When the second controller 42 detects the voltage of the second battery 22 being greater than 26 volts, the second controller 42 can stop issuing the closing signal 421, thereby opening the second switch device 41 to stop electrical power flowing from the external electrical power source 50 to the first battery 12.

In the modified embodiment, in addition to the first battery 12 being charged by the external electrical power source 50, the second battery 22 can be charged from the external electrical power source 50 as well. As shown, the modified embodiment may further comprise an electrical further-charging control unit 80 which includes a charging control switch 81 and a forwardly biased diode 82 electrically connected with the charging control switch 81, wherein the charging control switch 81 is electrically connected to the first battery 12, the forwardly biased diode 82 is electrically connected to the second battery 22 for allowing electrical current flowing from the first battery 12 to the second battery 22 while stopping electrical current flowing from the second battery 22 back to the first battery 12, and the first switch device 31 of the first control unit 30 is capable of issuing a closing signal 311 to the charging control switch 81 to form a closed electrical connection between the first battery 12 and the second battery 22. In the modified embodiment, when the external electrical power source 50 is charging the first battery 12, the second switch device 41 can issue an opening signal 411 to the first switch device 31 and thus can open the first switch device 31. At the same time, the first switch device 31 can issue a closing signal 311 to the charging control switch 81 and thus can close the charging control switch 81. Therefore, the electrical power flowing from the external electrical power source 50 to the first battery 12 can further go into the second battery 22 through the electrical further-charging control unit 80. As such, the external electrical power source 50 can be fully utilized; the first battery 12 and the second battery 22 can be charged more efficiently.

In conclusion, the solar power system of the present invention employs a primary solar power set, a secondary solar power set, and an external electrical power source to cooperatively charge a battery thereof. The arrangement of the solar power system can increase the efficiency of charging the battery. Furthermore, since the solar panels and the external source supply electrical power to the battery that in turn supplies electrical power for various electronic equipment directly or further through a dc-to-ac converter, an automatic transfer switch (ATS) is not used in the present invention, and thus electrical surge occurred in the conventional power equipment due to a changeover of power source can be avoided. Accordingly, the electronic equipment connected to the present invention can be prevented from damages caused by electrical surge.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A multiple redundant solar power system, comprising:
a primary solar power set including a first solar panel, a first battery electrically connected to the first solar panel, and a first electrical output line connected to the first battery;
a secondary solar power set including a second solar panel, a second battery electrically connected to the second solar panel, and a second electrical output line connected to the second battery;
a first control unit, capable of detecting a low voltage of the first battery, connected between the first battery and the second battery such that, when the first battery has a low voltage, the first control unit can react to the detection and form a closed electrical connection between the first battery and the second battery to allow electrical power to be supplied from the second battery to the first battery; and
a second control unit, capable of detecting a low voltage of the second battery, connected between the first battery and an external electrical power source such that, when the second battery has a low voltage, the second control unit can react to the detection and form a closed electrical connection between the first battery and the external electrical power source to allow electrical power to be supplied from the external electrical power source to the first battery.

2. The multiple redundant solar power system of claim 1, wherein when the second battery has a low voltage causing the second control unit to form a closed electrical connection between the external electrical power source and the first battery, the second control unit can issue an opening signal to the first control unit to open the electrical connection between the first battery and the second battery, so that the electrical power supplying from the second battery to the first battery can be stopped.

3. The multiple redundant solar power system of claim 1, wherein the first control unit includes a first switch device and a first controller, the first switch device being connected between the first battery and the second electrical output line connected to the second battery, the first controller being capable of detecting a low voltage of the first battery and thus issuing a closing signal to the first switch device, and wherein the first control unit further includes an ac-to-dc converter connected between the first switch device and the first battery.

4. The multiple redundant solar power system of claim 3, wherein the second control unit includes a second switch device and a second controller, the second switch device being connected between the first battery and the external electrical power source, the second controller being capable of detecting a low voltage of the second battery and thus issuing a closing signal to the second switch device, the second switch device being capable of issuing an opening signal to the first switch device.

5. The multiple redundant solar power system of claim 4, wherein the second control unit further includes an ac-to-dc converter connected between the second switch device and the first battery.

6. The multiple redundant solar power system of claim 1, wherein the first electrical output line of the primary solar power set is provided with a first dc-to-ac converter.

7. The multiple redundant solar power system of claim 1, wherein the second electrical output line of the secondary solar power set is provided with a second dc-to-ac converter.

8. The multiple redundant solar power system of claim 1, further comprising an electrical further-charging control unit including a charging control switch and a forwardly biased diode electrically connected with the charging control device, the charging control switch being electrically connected to the first battery, the forwardly biased diode being electrically connected to the second battery, the first control unit being capable of issuing a closing signal to the charging control switch to allow electrical power to be further supplied from the first battery to the second battery when the external electrical power source charges the first battery 9. The multiple redundant solar power system of claim 1, wherein the primary solar power set further includes a third solar panel, a third switch device electrically connected between the third solar panel and the first battery, and a third controller capable of detecting a low voltage of the first battery and thus issuing a closing signal to the third switch device to allow the third solar panel to charge the first battery.

10. The multiple redundant solar power system of claim 1, wherein the secondary solar power set further includes a fourth solar panel, a fourth switch device electrically connected between the fourth solar panel and the second battery, and a fourth controller capable of detecting a low voltage of the second battery and thus issuing a closing signal to the fourth switch device to allow the fourth solar panel to charge the second battery.

* * * * *